United States Patent
Lee et al.

(10) Patent No.: US 10,940,678 B2
(45) Date of Patent: Mar. 9, 2021

(54) POLYAMIDE COMPOSITIONS FOR METAL COATING AND METAL COMPONENTS COATED WITH THE SAME

(71) Applicant: Performance Polyamides, SAS, Paris (FR)

(72) Inventors: Kwang-Sang Lee, Seoul (KR); Mok-Keun Lim, Seoul (KR)

(73) Assignee: Performance Polyamides, SAS, Paris (FR)

( * ) Notice: Subject to any disclaimer, the term of this patent is extended or adjusted under 35 U.S.C. 154(b) by 234 days.

(21) Appl. No.: 15/036,728

(22) PCT Filed: Nov. 7, 2014

(86) PCT No.: PCT/EP2014/074073
§ 371 (c)(1),
(2) Date: May 13, 2016

(87) PCT Pub. No.: WO2015/071192
PCT Pub. Date: May 21, 2015

(65) Prior Publication Data
US 2016/0289497 A1 Oct. 6, 2016

(30) Foreign Application Priority Data

Nov. 15, 2013 (EP) .................................. 13193084

(51) Int. Cl.
*B32B 15/088* (2006.01)
*B32B 27/34* (2006.01)
*B32B 15/20* (2006.01)
*C08L 77/00* (2006.01)

(52) U.S. Cl.
CPC ............ *B32B 27/34* (2013.01); *B32B 15/088* (2013.01); *B32B 15/20* (2013.01); *C08L 77/00* (2013.01); *B32B 2509/10* (2013.01); *B32B 2597/00* (2013.01); *C08L 2203/18* (2013.01); *Y10T 428/31522* (2015.04); *Y10T 428/31681* (2015.04)

(58) Field of Classification Search
CPC ....... B32B 27/34; B32B 15/088; B32B 15/20; B32B 2509/10; B32B 2597/00; C08L 77/00; C08L 2203/18; C08L 51/06; C08L 23/08; Y10T 428/31522; Y10T 428/31681; C08K 5/092; C09D 177/00
See application file for complete search history.

(56) References Cited

U.S. PATENT DOCUMENTS

| 5,021,510 | A | * | 6/1991 | Vroomans | ............ | C08F 255/02 428/476.1 |
|---|---|---|---|---|---|---|
| 5,264,262 | A | | 11/1993 | Igarashi | | |
| 6,027,814 | A | | 2/2000 | Julien et al. | | |
| 2002/0128373 | A1 | | 9/2002 | Park | | |
| 2004/0028921 | A1 | | 2/2004 | Amouroux | | |
| 2006/0030693 | A1 | * | 2/2006 | Martens | ................... | C08K 5/09 528/310 |
| 2008/0009603 | A1 | | 1/2008 | Gault et al. | | |
| 2008/0096031 | A1 | | 4/2008 | Amouroux | | |
| 2011/0021477 | A1 | | 1/2011 | Gras Escardo et al. | | |
| 2011/0186170 | A1 | | 8/2011 | Oishi et al. | | |
| 2011/0214774 | A1 | | 9/2011 | Namgung | | |
| 2012/0021157 | A1 | | 1/2012 | Kawai et al. | | |
| 2012/0199237 | A1 | | 8/2012 | Oyaizu et al. | | |
| 2013/0025733 | A1 | | 1/2013 | Yamakawa et al. | | |
| 2013/0056106 | A1 | | 3/2013 | Yamakawa et al. | | |
| 2013/0068335 | A1 | | 3/2013 | Oyaizu et al. | | |
| 2013/0068338 | A1 | | 3/2013 | Shinoda et al. | | |

FOREIGN PATENT DOCUMENTS

| JP | H0493353 | A | 3/1992 |
|---|---|---|---|
| JP | 2003305804 | A | 10/2003 |
| JP | 2007238948 | A | 9/2007 |
| JP | 2008508400 | A | 3/2008 |
| JP | 201121063 | A | 2/2011 |
| WO | 9955793 | A1 | 11/1999 |
| WO | 2006015067 | A1 | 9/2006 |

OTHER PUBLICATIONS

Office Action issued in Japanese Application No. 2016-530824; dated Aug. 28, 2018 (8 pages).
Office Action issued in Brazilian Application No. BR112016010416-1, dated Aug. 11, 2020 (5 pages).

* cited by examiner

Primary Examiner — John D Freeman
(74) Attorney, Agent, or Firm — Osha Bergman Watanabe & Burton LLP

(57) ABSTRACT

The present invention provides polyamide compositions comprising (a) at least one high chain-length polyamide [polyamide (PA)]; (b) at least one grafted polyolefin [olefin (PO)]; and (c) at least one aromatic diacid [acid (DA)]. The polyamide composition can be advantageously used as a material to be coated on a surface of metal component.

7 Claims, No Drawings

POLYAMIDE COMPOSITIONS FOR METAL COATING AND METAL COMPONENTS COATED WITH THE SAME

CROSS-REFERENCE TO RELATED APPLICATIONS

The present application is a U.S. national stage entry under 35 U.S.C. § 371 of International Application No. PCT/EP2014/074073, filed Nov. 7, 2014, which claims priority to European patent application No. 13193084.4 filed on Nov. 15, 2013, and the whole content of such applications are hereby incorporated herein by reference. Should the disclosure of any patents, patent applications, and publications which are incorporated herein by reference conflict with the description of the present application to the extent that it may render a term unclear, the present description shall take precedence.

TECHNICAL FIELD

The present invention relates to polyamide compositions for metal coating and metal components of which surface is coated with the polyamide composition. The coated metal component is particularly suitable as a pipe for air conditioner or refrigerator application.

BACKGROUND OF THE INVENTION

Metallic pipes are used in various industries, for instance, as pipings, guardrails, fences, structures in public facilities, and so on. One of the industrial applications of metallic pipes resides in use as a pipe for refrigerant and air-conditioner. Aluminum pipe has been replacing the conventional copper-based pipe for this application in view of its advantageous characteristics, such as lightweight and cost-competitiveness. Also, the industrial applications also include a frame for a dishwasher and a metallic spring coating application.

Often, a resin composition, such as polyamide composition, is coated on a surface of the metal (for instance, aluminum) in order to impart impact resistance, mechanical strength, cold resistance, and/or anti-corrosion property. One of the coating processes in this regard is an extrusion coating with molten polyamide.

At least both good extrusion ability, especially under the condition of high-speed extrusion, and sufficient adhesion to a surface of the metal (e.g. aluminum) are required in the polyamide composition targeted for this application, yet such polyamide composition has not been available to date.

DESCRIPTION OF THE INVENTION

Thus, the purpose of the present invention is to provide a novel polyamide composition which can be advantageously used as a material to be coated on a surface of metal component, especially aluminum.

The present invention therefore relates to a polyamide composition comprising:
(a) at least one high chain-length polyamide [polyamide (PA)];
(b) at least one grafted polyolefin [olefin (PO)]; and
(c) at least one aromatic diacid [acid (DA)].

Indeed, it has been surprisingly found by the present inventors that an excellent extrusion ability and superior adhesion to metal surface can be attained by the polyamide composition of the present invention.

One of the essential features of the present invention resides in using at least one high chain-length polyamide, which has been found to provide excellent toughness due to the increased length of recurring units and greater propensity for chain orientation and/or entanglement, and higher ductility even at low relative humidity and/or low moisture content in the polymer, while maintaining excellent mechanical properties.

Another essential feature of the present invention resides in the use of both olefin (PO) and acid (DA) as additives in a polyamide-based composition. It has also been found that excellent flow characteristics as well as adhesion properties can be obtained through a combination of grafted polyolefin and aromatic diacid in a polyamide-based composition.

In the present invention, the expression "polyamide (PA)" is intended to denote, in particular, a polyamide comprising recurring units complying with any of formula (I) or formula (II) [recurring units $(R_{PA})$]:

—NH—$R^1$—CO—      formula (I):

—NH—$R^2$—NH—CO—$R^3$—CO—,      formula (II):

wherein:
  $R^1$, equal to or different from each other at each occurrence, is a divalent hydrocarbon group having from 1 to 17 carbon atoms;
  $R^2$, equal to or different from each other at each occurrence, is a divalent hydrocarbon group having from 1 to 18 carbon atoms; and
  $R^3$, equal to or different from each other at each occurrence, is a divalent hydrocarbon group having from 1 to 16 carbon atoms.

The polyamide of the inventive composition is preferably an aliphatic polyamide, that is to say that $R^1$, $R^2$ and $R^3$ are aliphatic group.

Recurring units $(R_{PA})$ of the polyamide (PA) can be notably obtained through polycondensation reaction of (1) one of β-lactam, 5-amino-pentanoic acid, ε-caprolactam, 9-aminononanoic acid, 10-aminodecanoic acid, 11-aminoundecanoic acid, and 12-aminododecanoic acid and/or (2) polycondensation reaction of at least one of oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], adipic acid [HOOC—$(CH_2)_4$—COOH], 2,4,4-trimethyl-adipic acid [HOOC—CH($CH_3$)—$CH_2$—C($CH_3$)$_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{12}$—COOH], and octadecandioic acid [HOOC—$(CH_2)_{16}$—COOH] with at least one of diamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4- dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PA}$) of the polyamide (PA) are notably:
(i) —NH—$(CH_2)_5$—CO—, i.e. recurring units which can be notably obtained via polycondensation reaction of ε-caprolactam;
(ii) —NH—$(CH_2)_8$—CO—, i.e. recurring units which can be notably obtained via polycondensation reaction of 9-aminononanoic acid;
(iii) —NH—$(CH_2)_9$—CO—, i.e. recurring units which can be notably obtained via polycondensation reaction of 10-aminodecanoic acid;
(iv) —NH—$(CH_2)_{10}$—CO—, i.e. recurring units which can be notably obtained via polycondensation reaction of 11-aminoundecanoic acid;
(v) —NH—$(CH_2)_{11}$—CO—, i.e. recurring units which can be notably obtained via polycondensation reaction of laurolactam;
(vi) —NH—$(CH_2)_6$—NH—CO—$(CH_2)_4$—CO—, i.e. recurring units which can be notably obtained via polycondensation reaction of hexamethylene diamine and adipic acid;
(vii) —NH—$(CH_2)_6$—NH—CO—$(CH_2)_8$—CO—, i.e. recurring units which can be notably obtained via polycondensation reaction of hexamethylene diamine and sebacic acid;
(viii) —NH—$(CH_2)_6$—NH—CO—$(CH_2)_{10}$—CO—, i.e. recurring units which can be notably obtained via polycondensation reaction of hexamethylene diamine and dodecanoic acid;
(ix) —NH—$(CH_2)_{10}$—NH—CO—$(CH_2)_{10}$—CO—, i.e. recurring units which can be notably obtained via polycondensation reaction of decamethylene diamine and decanoic acid;
(x) —NH—$(CH_2)_6$—NH—CO—$(CH_2)_7$—CO—, i.e. recurring units which can be notably obtained via polycondensation reaction of hexamethylene diamine and azelaic acid (otherwise known as nonandioic acid);
(xi) —NH—$(CH_2)_{12}$—NH—CO—$(CH_2)_{10}$—CO—, i.e. recurring units which can be notably obtained via polycondensation reaction of dodecamethylene diamine and dodecanoic acid;
(xii) —NH—$(CH_2)_{10}$—NH—CO—$(CH_2)_8$—CO—, i.e. recurring units which can be notably obtained via polycondensation reaction of decamethylene diamine and decanoic acid;
(xiii) —NH—$(CH_2)_4$—NH—CO—$(CH_2)_4$—CO—, i.e. recurring units which can be notably obtained via polycondensation reaction of 1,4-butanediamine and adipic acid; and
(xvi) —NH—$(CH_2)_4$—NH—CO—$(CH_2)_8$—CO—, i.e. recurring units which can be notably obtained via polycondensation reaction of 1,4-butanediamine and sebacic acid.

In the present invention, the expression "high chain-length polyamide" is intended to denote, in particular, a polyamide comprising recurring units, at least 50% moles of said recurring units complying with any of formula (III) or [recurring units($R_{PAL}$)]:

—NH—$R^4$—CO—   formula (III)

—NH—$R^5$—NH—CO—$R^6$—CO—,   formula (IV):

wherein:
$R^4$, equal to or different from each other at each occurrence, is a divalent hydrocarbon group having from 6 to 17 carbon atoms;
$R^5$, equal to or different from each other at each occurrence, is a divalent hydrocarbon group having from 7 to 18 carbon atoms; and
$R^6$, equal to or different from each other at each occurrence, is a divalent hydrocarbon group having from 5 to 16 carbon atoms.

The high chain-length polyamide of the inventive composition is preferably an aliphatic polyamide, that is to say that $R^4$, $R^5$ and $R^6$ are aliphatic groups.

Recurring units ($R_{PAL}$) of the polyamide (PA) can be notably obtained through (1) polycondensation reaction of one of 9-aminononanoic acid, 10-aminodecanoic acid, 11-aminoundecanoic acid, 12-aminododecanoic acid and/or (2) polycondensation reaction of one of pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{12}$—COOH], octadecandioic acid [HOOC—$(CH_2)_{16}$—COOH] with one of 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units ($R_{PAL}$) of the polyamide (PA) are notably:
(i) —NH—$(CH_2)_8$—CO—, i.e. recurring units which can be notably obtained via polycondensation reaction of 9-aminononanoic acid;
(ii) —NH—$(CH_2)_9$—CO—, i.e. recurring units which can be notably obtained via polycondensation reaction of 10-aminodecanoic acid;
(iii) —NH—$(CH_2)_{10}$—CO—, i.e. recurring units which can be notably obtained via polycondensation reaction of 11-aminoundecanoic acid;
(iv) —NH—$(CH_2)_{11}$—CO—, i.e. recurring units which can be notably obtained via polycondensation reaction of laurolactam;
(v) —NH—$(CH_2)_6$—NH—CO—$(CH_2)_8$—CO—, i.e. recurring units which can be notably obtained via polycondensation reaction of hexamethylene diamine and sebacic acid;
(vi) —NH—$(CH_2)_6$—NH—CO—$(CH_2)_{10}$—CO—, i.e. recurring units which can be notably obtained via polycondensation reaction of hexamethylene diamine and dodecanoic acid;
(vii) —NH—$(CH_2)_{10}$—NH—CO—$(CH_2)_{10}$—CO—, i.e. recurring units which can be notably obtained via polycondensation reaction of decamethylene diamine and dodecanoic acid;

(viii) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);

(ix) —NH—(CH$_2$)$_{12}$—NH—CO—(CH$_2$)$_{10}$—CO—, i.e. recurring units which can be notably obtained via polycondensation reaction of dodecamethylene diamine and dodecanoic acid; and (x) —NH—(CH$_2$)$_{10}$—NH—CO—(CH$_2$)$_8$—CO—, i.e. recurring units which can be notably obtained via polycondensation reaction of decamethylene diamine and decanoic acid.

The polyamide (PA) may comprise recurring units different from recurring units (R$_{PAL}$), as defined above. Notably, the polyamide (PA) may comprise recurring units (R$_{PAS}$) of shorter length, generally complying with any of formulae (V) and (VI):

$$—NH—R^7—CO— \quad \text{formula (V)}$$

$$—NH—R^8—NH—CO—R^9—CO—, \quad \text{formula (VI):}$$

wherein:
R$^7$, equal to or different from each other at each occurrence, is a divalent hydrocarbon group having 5 carbon atoms or less;

and wherein R$^8$ and R$^9$, equal to or different from each other at each occurrence, are divalent hydrocarbon groups, with the proviso that at least one of following conditions is satisfied:
R$^8$ has less than 7 carbon atoms; and/or
R$^9$ has less than 5 carbon atoms.

Recurring units (R$_{PAS}$) of the polyamide (PA) can be notably obtained through (1) polycondensation reaction of one of β-lactam, 5-amino-pentanoic acid, and ε-caprolactam, and/or (2) polycondensation reaction of at least one of 1,2-diaminoethane, 1,2-diaminopropane, propylene-1,3-diamine, 1,3-diaminobutane, 1,4-diaminobutane, 1,5-diaminopentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, and 1,6-diaminohexane with a diacid and/or (3) polycondensation reaction of at least one diamine with at least one of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], and adipic acid [HOOC—(CH$_2$)$_4$—COOH].

Non limitative examples of recurring units (R$_{PAS}$) of the polyamide (PA) are notably:
(i) —NH—(CH$_2$)$_5$—CO—, i.e. recurring units which can be notably obtained via polycondensation reaction of ε-caprolactam; and
(ii) —NH—(CH$_2$)$_4$—NH—CO—(CH$_2$)$_4$—CO—, i.e. recurring units which can be notably obtained via polycondensation reaction of 1,4-butanediamine and adipic acid; and
(iii) —NH—(CH$_2$)$_6$—NH—CO—(CH$_2$)$_4$—CO—, i.e. recurring units which can be notably obtained via polycondensation reaction of hexamethylene diamine and adipic acid.

Preferably, the polyamide (PA) consists essentially of recurring units (R$_{PAL}$), as above detailed, being understood that end-chain, defects and other irregularities can be present in the polyamide (PA) chain, without this affecting the properties thereof.

Recurring units (R$_{PAL}$) of the polyamide (PA) can be all of the same type, or can be of more than one type, that is to say that the polyamide (PA) can be a homo-polyamide or a co-polyamide.

Specific examples of the high chain-length polyamides (PA) which can be advantageously used in the hereby provided composition are notably:
polyamide 11 (consisting essentially of recurring units of type (iii) as above detailed);
polyamide 12 (consisting essentially of recurring units of type (iv) as above detailed);
polyamide 12,12 (consisting essentially of recurring units of type (ix) as above detailed);
polyamide 6,12 (consisting essentially of recurring units of type (vi) as above detailed);
polyamide 6,10 (consisting essentially of recurring units of type (v) as above detailed);
polyamide 10,10 (consisting essentially of recurring units of type (x) as above detailed);
polyamide 10,12 (consisting essentially of recurring units of type (vii) as above detailed);
and mixtures thereof.

Particularly, polyamide 6,10, polyamide 11, polyamide 12 or any mixtures thereof can be used in the present invention. Polyamide 6,10 can be most preferably used in the polyamide composition according to the present invention.

In the present invention, the expression "grafted polyolefin" or "olefin (PO)" is intended to denote, in particular, an olefin polymer grafted by at least one compound (a), which compound (a) contains at least one functional group (f), either laterally or at the end of the chain. The expression "olefin polymer" is understood to mean a polymer for which more than 50% by weight (wt %), preferably more than 60 wt %, particularly preferably more than 80 wt % of the monomer units are derived from at least one linear olefin. The degree of grafting of the olefin (PO) in the present invention can be advantageously measured using a Fourier transform infrared spectrometer and is usually greater than or equal to 0.1 wt %, preferably greater than or equal to 0.5 wt %. The degree of grafting of the olefin (PO) in the present invention is usually less than or equal to 50 wt %, preferably less than or equal to 35 wt % and in a particularly preferred manner less than or equal to 20 wt %.

The polyolefin constituting the backbone structure of the olefin (PO) is preferably chosen from homopolymers of olefins such as ethylene, propylene, 1-butene, 4-methyl-1-pentene, 1-hexene, 1-octene, 1-nonene, 1-decene, 1-undecene and 1-dodecene, copolymers of these various olefins with each other, the copolymers of these olefins with at least one other comonomers, and blends of these various polymers.

The comonomers may, in particular, be chosen:
from the linear α-monoolefins described above;
from branched α-monoolefins containing 4 to 12 carbon atoms such as 3-methylbutene, 4-methylpentene and 5-methylhexene;
from aryl vinyl monomers such as styrene, α-methylstyrene and ortho-methoxystyrene;
from vinyl esters such as vinyl acetate;
from halogenated vinyl and vinylidene monomers such as vinyl chloride and vinylidene chloride;
from vinyl alkyl ethers such as vinyl methyl ether and vinyl isobutyl ether;
from acrylic monomers such as acrylic and methacrylic acids, methyl acrylate, N,N-dimethylacrylamide and acrylonitrile;

from conjugated dienes such as butadiene, isoprene and 1,3-pentadiene;

from non-conjugated dienes such as 1,4-pentadiene, 7-methyl-1,6-octadiene, 5-ethylidene-2-norbornene and bicyclo[2.2.1]oct-2,5-diene.

The weight content of units formed from comonomers in the polyolefin is advantageously less than 40% by weight and preferably less than 20% by weight.

The polyolefins constituting the backbone structure of the olefin (PO) that are particularly preferred are ethylene homopolymers, propylene homopolymers, copolymers of ethylene with at least one other olefin chosen from propylene, 1-butene, 4-methyl-1-pentene, 1-hexene and octene, copolymers of propylene with at least one other olefin chosen from ethylene, 1-butene, 4-methyl-1-pentene, 1-hexene and 1-octene, 1-butene homopolymers, copolymers of ethylene or of propylene with minor amounts of diolefins or of unsaturated carboxylic acid esters, for instance ethylene/butadiene copolymers, propylene/butadiene copolymers, ethylene/vinyl acetate copolymers and ethylene/ethyl acrylate copolymers, and also from blends of these various polyolefins.

Ethylene homopolymers, propylene homopolymers, copolymers of ethylene with at least one other olefin chosen from propylene, 1-butene, 4-methyl-1-pentene, 1-hexene and octene, copolymers of propylene with at least one other olefin chosen from ethylene, 1-butene, 4-methyl-1-pentene, 1-hexene and 1-octene, and also blends of these various polyolefins, are most particularly preferred.

The functional group (f) may be any group having a reactivity or a polarity such that it enables to impart the olefin polymer certain functionality. It is usually chosen from:

(f.1) groups derived from carboxylic acids, also known more simply hereinbelow as "acid groups"; the carboxylic acids from which these groups originate may be monocarboxylic or dicarboxylic acids;

(f.2) groups derived from carboxylic anhydrides, resulting from the condensation of two carboxylic acid groups in the same molecule, also known more simply hereinbelow as "anhydride groups"; the carboxylic anhydrides that bear these groups may themselves derive from monocarboxylic or dicarboxylic acids;

(f.3) groups derived from carboxylic esters, also known more simply hereinbelow as "ester groups";

(f.4) groups derived from carboxylic amides, also known more simply hereinbelow as "amide groups";

(f.5) epoxy groups, derived from compounds containing a cyclic ether function;

(f.6) hydroxylated groups derived from alcohols, also known more simply hereinbelow as "alcohol groups"; the alcohols from which these groups originate may be monoalcohols or polyols;

(f.7) carbonyl groups;

(f.8) hydrolysable groups containing a silyl group;

(f.9) oxazoline groups;

(f.10) azlactone groups;

(f.11) isocyanate groups.

As mentioned, the functionalization of the olefin polymer is carried out by grafting, to this polymer, at least one compound (a) that contains at least one functional group (f).

In order to be able to be grafted to the olefin polymer, the compound (a) must also contain at least one group (g) that makes the grafting of said compound (a) to this polymer possible. This group (g) is generally chosen from:

saturated or unsaturated hydrocarbon-based groups, capable of participating in radical mechanisms, such as additions or associations of radicals;

amino or phenol groups capable of participating in reactions of nucleophilic character;

groups capable of easily forming free radicals such as peroxy and azo groups.

Preferably, the group (g) is chosen from organic groups having at least one ethylenically unsaturated carbon-carbon bond, from amino groups and from peroxy groups. Organic groups having at least one terminal ($\alpha,\beta$) ethylenically unsaturated carbon-carbon bond, such as vinyl, allyl, acryloyloxyalkyl and methacryloyloxyalkyl groups for example, are particularly preferred as the group (g). Allyl groups give the best results.

Examples of compounds (a) that contain at least one organic group having at least one terminal ($\alpha,\beta$) ethylenically unsaturated carbon-carbon bond as group (g) and at least one acid or anhydride group as the functional group (f) are unsaturated monocarboxylic or dicarboxylic acids such as acrylic acid, methacrylic acid, maleic acid, fumaric acid, itaconic acid, crotonic acid, citraconic acid, bicyclo[2.2.1]hept-2-ene-5,6-dicarboxylic acid, maleic anhydride, itaconic anhydride, crotonic anhydride and citraconic anhydride. Maleic anhydride is particularly preferred.

Examples of compounds (a) that contain at least one organic group having at least one terminal ($\alpha,\beta$) ethylenically unsaturated carbon-carbon bond as groups (g) and at least one ester group as functional group (f) are vinyl acetate, vinyl propionate, monomethyl maleate, dimethyl maleate, methyl acrylate, ethyl acrylate, n-propyl acrylate, n-butyl acrylate, isobutyl acrylate, amyl acrylate, hexyl acrylate, 2-ethylhexyl acrylate, methyl methacrylate, ethyl methacrylate, n-propyl methacrylate, n-butyl methacrylate, amyl methacrylate, hexyl methacrylate, 2-ethylhexyl methacrylate, diethyl fumarate, dimethyl itaconate and diethyl citraconate.

Examples of compounds (a) that contain at least one organic group having at least one terminal ($\alpha,\beta$) ethylenically unsaturated carbon-carbon bond as group (g) and at least one amide group as functional group (f) are acrylamide and methacrylamide.

An example of compound (a) that contains at least one organic group having at least one terminal ($\alpha,\beta$) ethylenically unsaturated carbon-carbon bond as group (g) and at least one epoxy group as functional group (f) is allyl glycidyl ether.

Examples of compounds (a) that contain at least one organic group having at least one terminal ($\alpha,\beta$) ethylenically unsaturated carbon-carbon bond as group (g) and at least one alcohol group as functional group (f) are allyl alcohol and 3-allyloxy-1,2-propanediol.

Examples of compounds (a) that contain at least one organic group having at least one terminal ($\alpha,\beta$) ethylenically unsaturated carbon-carbon bond as group (g) and at least one carbonyl group as functional group (f) are organic heterocyclic compounds containing a vinyl or allyl group attached to the heteroatom and the heterocycle which bears the carbonyl bond, such as N-vinylpyrrolidone and N-vinylcaprolactam.

Examples of compounds (a) that contain at least one organic group having at least one terminal ($\alpha,\beta$) ethylenically unsaturated carbon-carbon bond as group (g) and at least one hydrolysable group containing a silyl group as functional group (f) are vinyltrimethoxysilane, vinyltriethoxysilane, vinyltriacetoxysilane, vinyltris($\beta$-methoxyethoxy)silane and $\gamma$-methacryloxypropyltrimethoxysilane.

Examples of compounds (a) that contain at least one organic group having at least one terminal (α,β) ethylenically unsaturated carbon-carbon bond as group (g) and at least two functional groups (f) of different nature, are: glycidyl acrylate and methacrylate (an ester group and an epoxy group as functional groups (f)); hydroxyethyl acrylate and methacrylate and hydroxypropyl acrylate and methacrylate (an ester group and an alcohol group as functional groups (f)); N-methylolmethacrylamide (an alcohol group and an amide groups as functional groups (f)).

The grafting of the compound (a) to the olefin polymer may be carried out by any method known for this purpose. Depending on the chemical properties and the physical state of the compound (a), this grafting may be carried out in the solid state, in solution, in suspension, in an aqueous medium or within an organic solvent. This grafting may also be carried out by irradiation, for example by means of an electron beam or by gamma radiation.

The grafting of the compound (a) to the olefin polymer is most generally carried out on a molten blend of the compound and polymer. It is possible to operate in batch mode, in kneaders, or continuously, in extruders.

The reaction of grafting the compound (a) to the olefin polymer is usually promoted and initiated by a radical generator, at least when the group (g) of the compound (a) is not itself a group capable of easily forming free radicals, such as peroxy and azo groups. As a radical generator, use is generally made of compounds having a decomposition temperature between 120 and 350° C. and a half life, in this temperature zone, of around one minute. The radical generator is preferably an organic peroxide, and more particularly an alkyl or aryl peroxide. Among these, mention may be made of benzoyl peroxide, dichlorobenzoyl peroxide, dicumyl peroxide, di(t-butyl) peroxide, t-butylcumyl peroxide, 1,3-di(2-t-butylperoxyisopropyl)benzene, 2,5-dimethyl-2,5-di(t-butylperoxy)hexane and 2,5-dimethyl-2,5-di(t-butylperoxy)-3-hexyne. 2,5-Dimethyl-2,5-di(t-butylperoxy) hexane and dicumyl peroxide are particularly preferred.

When the grafting of the compound (a) to the olefin polymer is carried out continuously in an extruder, the radical generator and the compound (a) may be introduced in any manner so long as they are introduced continuously over time and they are well dispersed in the molten material. The radical generator and the compound (a) may be introduced by spraying, for example by means of a spray-type injector or an atomizer or by injection into the molten mass.

The polyolefins grafted with maleic anhydride is particularly preferred in the present invention. Among the polyolefins grafted with maleic anhydride functions, mention may be made of grafted homopolymers, such as polyethylene grafted with maleic anhydride, or grafted copolymers, such as ethylene/methyl acrylate type or ethylene/ethyl acrylate type in which the reactive function, in this case maleic anhydride, is grafted onto the polyolefin.

In the present invention, the expression "aromatic diacid" is intended to denote, in particular, a compound having at least two acid groups and at least one aromatic ring. Preferably, the aromatic diacid comprises two carboxylic acid groups directly or indirectly (for instance, through alkylene group) connected to an aromatic moiety, such as benzene ring. Examples thereof include notably phthalic acids (including isophthalic acid and terephthalic acid), naphthalene dicarboxylic acid (including 2,6-naphthalene dicarboxylic acid, 2,7-naphthalene dicarboxylic acid,1,4-naphthalene dicarboxylic acid, and 1,8-naphthalene dicarboxylic acid), pyridine dicarboxylic acid (including 2,5-pyridinedicarboxylic acid, 2,4-pyridinedicarboxylic acid, and 3,5-pyridinedicarboxylic acid), and polynuclear aromatic diacid (including notably 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl) hexafluoropropane, 2,2-bis(3-carboxyphenyl)ketone, and bis(3-carboxyphenoxy)benzene), but the present invention is not limited thereto.

While not being bound by any particular theory, it is believed that the longer chain length polyamides, such as the high chain-length polyamides, provide greater toughness due to the increased length of recurring units and greater propensity for chain orientation and/or entanglement, and higher ductility even at low relative humidity and/or low moisture content in the polymer, while attaining excellent mechanical properties. In the present invention, the polyamide preferably has low viscosity index (VI). In the present invention, an amount of (a) at least one polyamide is preferably 45 to 98.9 wt %, more preferably 68 to 94.5 wt % relative to the total weight of the polyamide composition.

The most preferred high chain-length polyamide in the polyamide composition according to the present invention is polyamide 6,10, i.e. a polyamide consisting of recurring units of formula —NH—$(CH_2)_6$—NH—CO—$(CH_2)_8$—CO—, which can be obtained from polycondensation of hexamethylene diamine and sebacic acid. Polyamide 6,10 is particularly advantageous in the present invention in view of mechanical strength, gas barrier property, particularly against refrigerants, high temperature properties, and/or environmental friendliness.

Without wishing to be bound by any particular theory, it is believed that the component (b), i.e. at least one grafted polyolefin [olefin (PO)], being present in a polyamide composition can function as an adhesion modifier in the present invention. The grafted polyolefin is preferably a polyolefin grafted with maleic anhydride, more preferably a polyethylene grafted with maleic anhydride, still more preferably a high- or low-density polyethylene grafted with maleic anhydride. The polyolefin grafted with maleic anhydride can function to increase an adhesion of the polyamide composition layer to a target substrate, while imparting flexibility in terms of contraction and expansion of the composition layer. In the present invention, an amount of (b) at least one grafted polyolefin is preferably 1 to 50 wt %, more preferably 5 to 30 wt %, still more preferably 10 to 20 wt % relative to the total weight of the polyamide composition.

Further, the polyamide composition of the present invention comprises (c) at least one aromatic diacid [acid (DA)] as an additive to the composition. In the present invention, the component (c) is not comprised as a part of recurring unit for the polyamide. Rather, the at least one aromatic diacid is used as an additive to the composition. Without wishing to be bound by any particular theory, it is believed that this use of acidic component (c) can further impart adhesion of the composition layer as well as improve flow property. Especially, it has been found by the present inventor that addition of the acid (DA) to the composition comprising the polyamide (PA) and the olefin (PO) enables the flow properties required in high-speed coating process. The aromatic diacid is preferably an aromatic dicarboxylic acid, more preferably selected from the group consisting of isophthalic acid and terephthalic acid, still more preferably isophthalic acid. In the present invention, an amount of (c) at least one aromatic diacid is preferably 0.1 to 5.0 wt %, more preferably 0.5 to 2.0 wt % relative to the total weight of the polyamide composition.

The polyamide composition of the present invention may also contain, in addition to the above components (a), (b) and (c), any additive usually used in the polyamide-based compositions. Thus, the polyamide composition according to the present invention may further comprise one or more additive selected from the group consisting of antioxidant, heat stabilizer, UV stabilizer, colorant, lubricant, plasticizer, and any combination thereof.

The antioxidant and heat stabilizer are, for example, alkali metal halides, copper halides, the sterically hindered phenolic compounds, or aromatic amines. UV stabilizers are generally benzotriazoles, benzophenones or hindered amine light stabilizers (HALS). Colorant can be pigment, dye or combination thereof.

The range of concentration by weight of the additive, if contained in the composition, may be from 0.1 to 5 wt %, preferably from 0.5 to 2 wt % relative to the total weight of the polyamide composition.

In the present invention, the polyamide composition preferably comprises:
(a) at least one high chain-length polyamide [polyamide (PA)], as above detailed;
(b) at least one grafted polyolefin [olefin (PO)], as above detailed;
(c) at least one aromatic diacid [acid (DA)], as above detailed;
(d) optionally at least one UV stabilizer;
(e) optionally at least one antioxidant; and
(f) optionally at least one colorant.

The polyamide composition of the present invention can be obtained by mixing the various components generally in a single or twin screw extruder at a temperature sufficient to maintain the polyamide resin in the melt. Generally, the mixture is extruded into rods which are cut into pieces to form granules or pellets. Additives may be added together or separately by mixing polyamide hot or cold. Thusly-obtained granules or pellets can be further processed to powder form, for instance, by grinding with liquid nitrogen.

The sum of the compounds and additives may be achieved by adding these compounds in the melt or in the dry form or as a concentrate mixture into a resin as a polyamide resin such as polyamide or grafted polyolefin.

The obtained polyamide composition can be used as raw material for coating a surface of metal, in particular aluminum. The adhesion of the layer made of the polyamide composition to the surface of metal can be promoted through a primer layer. Examples of the material for the primer layer include epoxy, and phenol resins optionally modified with at least one functional group, such as epoxy, vinyl and amine, but the present invention is not limited thereto. The preferred primer layer in the present invention is an epoxy layer. The polyamide composition of the present invention may attain particularly excellent adhesion to a surface of aluminum with epoxy primer.

The polyamide composition of the present invention preferably has a melt flow index (MFI) of at least 7, preferably at least 10 g/10 min., as measured by ASTM D-1238 at 235° C. with a load thereon of 2.16 kg. In the present invention, the upper limit of MFI of the polyamide composition is not particularly limited, and may be up to 100.

Thus, the present invention is also related to a metal component of which surface is coated with the polyamide composition according to the present invention. The metal component of the present invention preferably comprises an epoxy primer between the surface of metal and the polyamide composition layer coated thereon. The metal is preferably aluminum. The metal component according to the present invention is suitably used as a pipe for an air-conditioner or refrigerator applications.

The polyamide composition according to the present invention can be applied to the surface of metal, for instance, by the method for manufacturing aluminum tube as described in US Publication No. 2011/0214774. This method comprises a supply step wherein an aluminum tube is supplied, a high frequency preheating step wherein said aluminum tube is preheated using high frequency heating, an adhesive coating step wherein the surface of said preheated aluminum tube is coated with an adhesive, and a resin coating step wherein said aluminum tube coated with said adhesive is coated with a resin. The polyamide composition according to the present invention can be used as the resin in the above, but the present invention is not limited thereto.

Further aspect of the present invention is use of (b) at least one grafted polyolefin [olefin (PO)] and (c) at least one aromatic diacid [acid (DA)], as an adhesion promoter in a thermoplastic polymer composition to be applied to metal. Examples of the thermoplastic polymer include polyethylene terephthalates (PET), polybutylene terephthalates (PBT), polyphenylene sulfides (PPS) and polyesters, but the present invention is not limited thereto. As to the details of the component (b) and the component (c) in this aspect, the above corresponding explanations can be referred. In this aspect, the olefin (PO) is preferably the polyolefin grafted with epoxy groups or anhydride groups, in particular polyethylene grafted with epoxy groups or anhydride groups.

While preferred embodiments of this invention have been shown and described, modifications thereof can be made by one skilled in the art without departing from the teaching of this invention. The embodiments and examples described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

Further details and advantages of the invention will become apparent from the examples given below for illustrative purposes only.

EXAMPLES

Example 1

Preparation of Polyamide Composition 1

Examples 2 and 3 (Comparative)

Preparation of Polyamide Compositions 2 and 3

The polyamide compositions were prepared by mixing the components indicated in Table 1 below in a twin-screw extruder and subsequently extruding the mixture:

TABLE 1

| Components | Polyamide composition 1 (Present Invention) | Polyamide composition 2 (Comparative) | Polyamide composition 3 (Comparative) |
|---|---|---|---|
| PA610[1)] | 83.0 wt % | 83.5 wt % | — |
| PA6 [2)] | — | — | 83.5 wt % |
| LDPE-g-MAH[3)] | 15.0 wt % | 15.0 wt % | 15.0 wt % |

TABLE 1-continued

| Components | Polyamide composition 1 (Present Invention) | Polyamide composition 2 (Comparative) | Polyamide composition 3 (Comparative) |
|---|---|---|---|
| Flow Aid[4] | 0.5 wt % | — | 0.5 wt % |
| Other additives[5] | 1.5 wt % | 1.5 wt % | 1.5 wt % |

[1] Polyamide 6,10 ("Shandong Type 1"), available from Shandong Dongchen Engineering Plastic Co., Ltd.
[2] Polyamide 6 ("Domamid ®24"), available from Domo Chemicals.
[3] Low-density polyethylene ("LDPE") grafted with maleic anhydride ("Modic L503"), available from Mitsubishi Chemical Corporation
[4] Isophthalic acid ("IPA"), available from KP Chemical Corp.
[5] Mixture of UV stabilizer, antioxidant, and colorants Example 4

Coating of Polyamide Composition on a Surface of Aluminum Pipe

Thusly-obtained polyamide compositions were used as a coating material for aluminum pipe. The coating process was conducted in accordance with the method comprising a supply step wherein an aluminum pipe roll was supplied, a high frequency induction preheating step wherein said aluminum pipe was cleaned and heated by torch flame, an adhesive coating step wherein the surface of said preheated aluminum pipe was coated with an epoxy adhesive and heated using high frequency induction heating, and a resin coating step wherein said aluminum pipe coated with said adhesive was coated with the polyamide compositions according to Examples 1 to 3.

Example 5

Measurement of Properties of Coated Aluminum Pipe

The properties below of the coated surface on the aluminum pipe were assessed. The results are summarized in Table 2 below:
Adhesion Test:
10 mm width of the coated surface of the aluminum pipe was peeled off. Both ends of the pipe were pulled by universal tensile machine. An adhesion strength where the coated surface is peeled off was measured.
Coating Thickness Homogeneity and Surface Roughness:
Both properties were assessed visually.

TABLE 2

| Composition | Polyamide composition 1 (Present Invention) | Polyamide composition 2 (Comparative) | Polyamide composition 3 (Comparative) |
|---|---|---|---|
| Coating thickness homogeneity | Satisfactory | Unsatisfactory | Unsatisfactory |
| Surface roughness | Satisfactory | Unsatisfactory | Unsatisfactory |
| Adhesion strength (MPa [kgf/cm$^2$] *) | 0.471 [4.8] | 0.353 [3.6] | 0.206 [2.1] |

* 1 kgf/cm$^2$ = 0.098066 MPa (1 MPa = 106 N/m$^2$ = 10.197162 kg force/cm$^2$)

The above experimental results show that the polyamide composition according to the present invention which comprises high chain-length polyamide and aromatic diacid, can attain superior surface qualities as well as excellent adhesion strength when applied as a metal coating, compared to those properties of the metal coating made from the comparative compositions which do not comprise high chain-length polyamide or aromatic diacid additive.

The invention claimed is:

1. An article, comprising a metal component having a surface coated with a polyamide composition, wherein the polyamide composition comprises:
    (a) at least one high chain-length polyamide in an amount ranging from 68 to 94.5% by weight, relative to the total weight of the polyamide composition;
    (b) at least one grafted polyolefin in an amount ranging from 5 to 30% by weight, relative to the total weight of the polyamide composition; and
    (c) at least one aromatic diacid in an amount ranging from 0.5 to 5.0% by weight, relative to the total weight of the polyamide composition,
    wherein the high chain-length polyamide is polyamide 6,10,
    wherein the aromatic diacid is selected from the group consisting of isophthalic acid and terephthalic acid, and
    wherein the at least one grafted polyolefin comprises a high- or low-density polyethylene grafted with maleic anhydride.

2. The article according to claim 1, wherein the polyamide composition further comprises one or more additive selected from the group consisting of antioxidant, heat stabilizer, UV stabilizer, colorant, lubricant, plasticizer, and any combination thereof.

3. The article according to claim 1, wherein the metal component comprises aluminum.

4. The article according to claim 1, wherein the article is suitable for use in an air-conditioner, a refrigerator, a dishwasher, or a metallic spring application.

5. The article according to claim 1, wherein the aromatic diacid is isophthalic acid.

6. The article according to claim 1, wherein the amount of the aromatic diacid is from 0.5 to 2.0% by weight, relative to the total weight of the polyamide composition.

7. A method for improving adhesion of a thermoplastic polyamide polymer composition to metal, comprising adding at least one grafted polyolefin in an amount ranging from 5 to 30% by weight, relative to the total weight of the thermoplastic polyamide composition wherein the at least one grafted polyolefin comprises a high- or low-density polyethylene grafted with maleic anhydride, and at least one aromatic diacid in an amount ranging from 0.5 to 5.0% by weight, relative to the total weight of the thermoplastic polyamide composition, wherein the aromatic diacid is selected from the group consisting of isophthalic acid and terephthalic acid, as an adhesion promoter in the thermoplastic polyamide polymer composition and applying the thermoplastic polyamide polymer composition to metal, wherein the thermoplastic polyamide polymer composition further comprises at least one high chain-length polyamide, wherein the high chain-length polyamide is polyamide 6,10, and wherein the high chain-length polyamide is present in an amount ranging from 68 to 94.5% by weight, relative to the total weight of the polyamide composition.

* * * * *